United States Patent Office  3,495,711
Patented Feb. 17, 1970

3,495,711
SYSTEM FOR TREATING SEWAGE WATER USING FLOCCULATION AND AERATION AS A MEANS THEREBY
Sixten Englesson, Djursholm, and Sven Gustaf Yngve Gamer, Norrkoping, Sweden, assignors to Stenberg-Flygt AB, Solna, Sweden, a corporation of the Kingdom of Sweden
Filed Apr. 1, 1968, Ser. No. 717,547
Claims priority, application Sweden, Apr. 5, 1967, 4,785/67
Int. Cl. C02c 1/10; B01d 21/08, 21/01
U.S. Cl. 210—195                                    8 Claims

ABSTRACT OF THE DISCLOSURE

A system for treating sewage water using flocculation and aeration as a means thereby. The system includes a buffer or equalizing chamber, a flocculating chamber, a sedimentation chamber and a regenerating chamber, all of said chambers being collected in an integrated array within a cylindrical casing, to form a compact treatment system.

---

Figure 1:
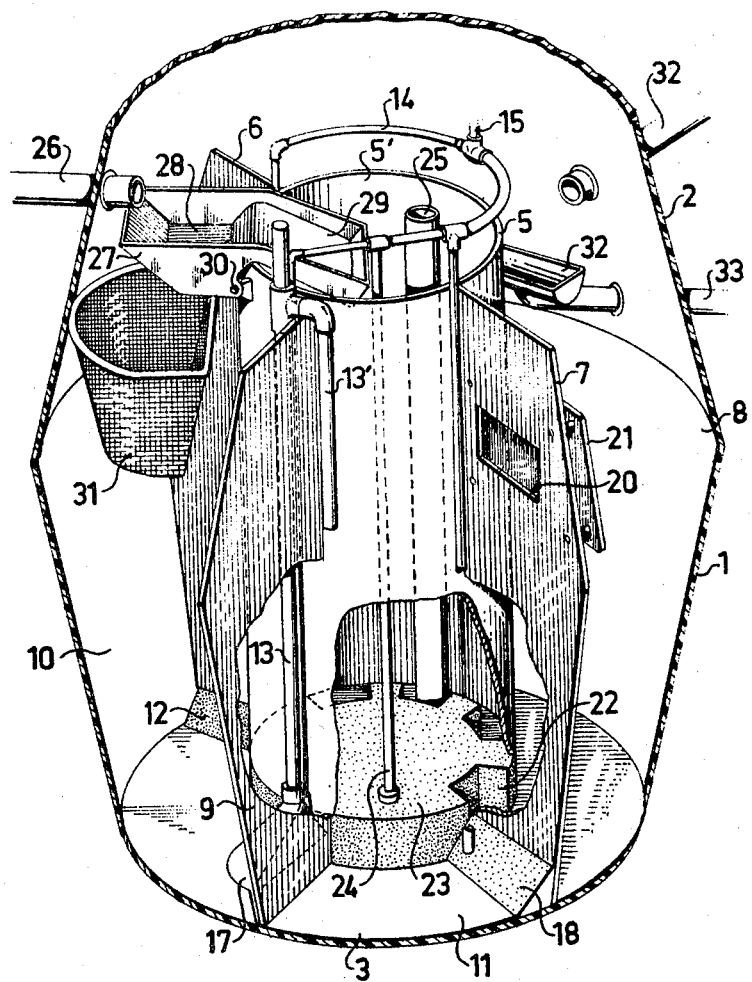

The main component of the aerobic flocculating process is the flocculation substance generator which replaces the digester in the anaerobic process. Viewed hydraulically said generator is connected in a corresponding manner at the side of the main water flow.

The function of the digester tank is to take charge of separated sludge, neutralize and remove the same. Separation of sludge and water in the main water flow is incomplete if chemical flocculation is not used. In the former instance the digester only receives a portion of suspended and dissolved substance, which should be removed from the water.

The flocculating substance generator or precipitate substance generator creates, under favorable conditions, a highly adsorbtive flocculating agent, which when returned to the main water flow precipitates the turbidity of the water and certain dissolved substances. The floc is formed under well known conditions, essentially by stirring slowly. It is known from the operation of water works that a number of tanks connected in series with varying stirring intensity give the lowest rest content of turbidity of the water phase. Aeration, when adapted in a certain manner, gives similar results. The sludge phase is then separated in the settling tank where no filtering is required and then returns to regeneration. Settling is effected so much more rapidly when flocculating than when not flocculating that the sum of the flocculating and settling volume is lower, or not greater, than when solely de-slamming non-deflocculating water.

When attempting to find ways of improving the treatment of sewage water by means of flocculation it should be noted that the reaction rate of the biological oxidation process, evident from a BOD-diagram cannot be affected, but is determined by the temperature where BOD is defined as the biochemical oxygen demand necessary for converting the biochemical substances present in the treated water. This concerns the relative rate, which means that at given temperatures a certain portion of total BOD is decomposed over a certain time, e.g. 67% after 5 days at 20° C. When varying the concentration the absolute BOD-decomposition is affected in proportion to the concentration. The quantity of bacteria necessary for the conversion is clearly formed for each substrate concentration and temperature. Thus, if a conclusion should be drawn from these laboratory tests, an optimal concentration of substrate and biological material should be maintained. One method of providing such a rise in concentration would be the application of a flocculating substance. This is seldom applied, however, for cost reasons. It is expensive in systems used in practice to obtain theoretically the duration of stay for the BOD time sequence for the full mass of water. If it were possible to deflocculate the sludge rapidly by aeration the clarified water could be allowed to depart and the sludge could then be treated during the necessary period of time at reasonable costs.

This is what happens in conventional systems, but the age of the sludge is usually restricted to, approximately 3 days. For purposes of the present invention age may be defined as the number of days, during which the sludge is exposed to bacterial decomposition under the application of oxygen.

After this time has passed, a third of the sludge is removed each day along with a portion of newly arrived sludge and usually introduced into a digester where the aerobic sequence is interrupted and replaced by an anaerobic process. In this connection about ⅔ of BOD departs in gas form as methane $CH_4$ and carbon dioxide $CO_2$. The albumin is decomposed partly to ammoniac (or ammonium bicarbonate) $NH_4OH+NH_4 \cdot HCO_3$. The phosphorous is converted substantially to $HPO_4$-ions.

The drawbacks associated with conventional systems are that they are technically complicated. Examples of conventional systems are presedimentation, aeration plants, separation plants for the sludge and similarly expensive digesters which in one known process must be heated to about 30° C. and in another process to about 50° C. Furthermore, it is necessary to tap the sludge surplus in the form of digested sludge. The disadvantage associated with the departing sludge water remains.

Stabilization aerators have also been designed, where the excess of sludge in the active sludge process is not removed until a relatively long time has passed. Examples of other systems are:

(1) The Netherland ring channels.
(2) Swedish one-day aerators.
(3) Agitation aerator systems etc.

In all of these instances attempts have been made to extend the sludge age, but it is often found that the system in this instance requires more oxygen than has been accessible.

By removing a considerably smaller amount of BOD with the surplus sludge, BOD is accumulated and thereby a higher load on the system is obtained, which results in the air and the oxygen not reaching the inner portions of the floc particles of sludge. Consequently, instead of obtaining an aerobic process in the interior of the floc, an anaerobic process is obtained.

Consequently, when considering such a plant of conventional design it is found that when the oxidation capacity is relatively high there is a deficiency of oxygen in the sludge, in spite of the fact that the water phase is partly saturated with oxygen. The efficiency of the oxygen supply means decreases in proportion with the supply of oxygen, i.e. air is introduced into a mass of water which is already supplied with oxygen.

The problem which exists is thus to introduce oxygen to the interior of the floc without it being necessary to pass a highly oxygenized water phase.

Attempts have been made to solve these difficulties by restricting the BOD-load per unit volume (water or system) and also the load per unit weight sludge in the system, with the intention of obtaining a sludge concentration in the system assumed to be favourable for oxygenizing of the sludge. The prominent research scientist Eckenfelder in the U.S.A. has discovered, purely empirically, that the concentration of sludge in a number of existing systems does not increase above 3000–5000 gram of dry substance per cubic meter aerated sludge volume, and simultaneously gives as a standard that the BOD-load should suitably be restricted to not more than 0.2 kg. BOD 5d 20° C. per kg. dry substance sludge in the system.

Thereby a maximum limit is placed on the BOD-load per cubic meter of 5 kg./m.$^3 \times 0.2 = 1$ kg. BOD/m.$^3$d.

For ring channels this is given as up to and including 0.2 kg. BOD/m.$^3$d.

It is true that if these recommendations are followed a satisfactory oxygenation of the sludge is obtained, but the systems are bulky and expensive and the sludge surplus obtains a high water content, is voluminous and requires expensive dewatering arrangements.

The present invention eliminates the aforementioned disadvantages. The present invention is based upon the new conception that oxygenizing of the sludge particles is by no means promoted by low BOD contact or sludge concentration in the water phase.

On the contrary, tests have shown that the water phase about the floc particles constitutes a diffusion-preventing interface around said particles, which makes difficult the transfer of oxygen to the bacteria cooperating with the oxidation of the floc particles. Said interface also obstructs the removal of decomposition products caused by the bacteria activity during the oxidation process.

The present invention is thus mainly concerned with providing a system wherein, instead of aerating incoming sewage water intermixed with activated sludge, the enriched or recovered relatively stationary sludge, i.e. sludge presenting no rotary motion, is aerated. The aeration of the sludge is accomplished by providing a high relative movement between each individual air bubble and the sludge particles, so that good contact between the interface of the air bubbles and the sludge particles is obtained. This is opposed to known sludge aeration systems, where the main emphasis is placed upon a roller-like movement of the sludge rotating with the air stream, which gives little relative movement between the sludge particles and the air bubbles.

In addition to the aforementioned observations the following observation are also of significance in the design of a system according to the present invention.

The reason why the sludge is aerated instead of the water is that, according to the German research scientist Geiger, the absorption of oxygen from an air bubble in water has already taken place after ¼ sec. The water around the bubbles is thus already saturated with oxygen. In this respect it can be asked whether it is expedient to break down the sludge in order to facilitate aeration.

However, two important observations must be placed on the aeration of sewage sludge:

(1) There must be flocculation in order for the sludge to sink.

(2) A high adsorption is desired between the bacteria culture and the sludge, and when viewed from this point no coagulation or flocculation is desired. Thus, these two functions are opposed to one another. Consequently, conventional systems, where aeration and flocculation are effected in the same tank, are not rational or purposeful.

Water treatment systems according to the invention thus present preferably as an integrated unit, a mixing equalizing or buffer tank for accommodating the incoming sewage water, a flocculating tank where activated or regenerated sludge serves as the flocculating agent, a sedimentation tank for concentration or enrichment of the sludge and separation of the water phase, and a regeneration tank for activating the enriched sludge. Preferably these are designed in an integrated unit comprising a mixing-buffer chamber, a flocculating chamber, a sedimentation chamber and a regenerating chamber. The water treatment system has thus a total of at least four chambers.

According to a further development of the invention an air lift pump is arranged between the sedimentation and regeneration chambers in the form of openings in the wall between the chambers, and aeration cushions in the regeneration chamber, and air lift action through the aeration cushions. Arranged between the buffer and flocculation chambers is a second air lift pump. The first mentioned chamber may thus also serve as equalizing chamber upon a sudden inflow of fluid.

The wall between the flocculating chamber and the sedimentation chamber is also provided with an opening, preferably somewhat below the water level which is determined by the spillway in the sedimentation chamber.

In order to supply a fixed amount of regenerated sludge to the incoming sewage water a metering arrangement is situated between the buffer chamber or flocculating chamber and the regeneration chamber, the metering arrangement suitably being in the form of a tiltable scoop, for instance a double scoop, where the one scoop is filled with running sewage water while the other one is immersed into the regenerated sludge. The mutual volume of the scoop is adjusted according to the desired concentration of sludge in the sewage water. The volume which can be removed by the smaller scoop reaches to between ⅛ and ¼ of the volume of the larger scoop.

According to a particularly advantageous embodiment of the invention the integrated system is formed in the shape of a circular well, in which the regeneration chamber forms a cylindrical inner room, where remaining chambers form outer rooms in the shape of a segmented ring.

Figure 2:
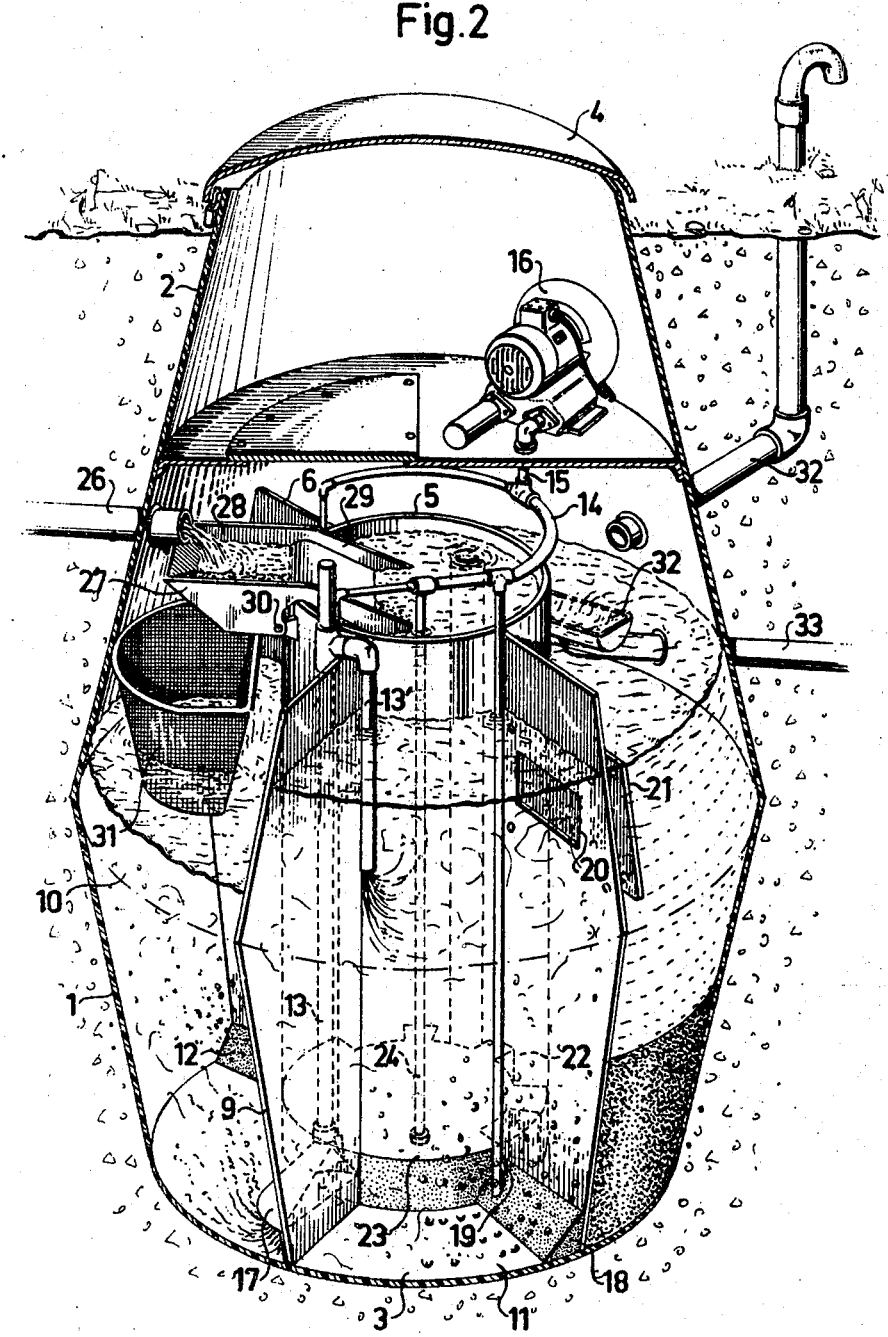

One embodiment of a system according to the invention will now be described with reference to the accompanying drawings, in which:

FIGURE 1 shows the most important parts of the system, before the system has been put into operation, while FIGURE 2 shows a cross-section of a treatment system according to the invention in operation.

As can be seen from the figures, the casing of the treatment system is comprised of two truncated conical cylinders 1 and 2, which have been posoitioned one on top of the other and with the flaring edges turned towards each other, whereafter they have been lowered into the ground. Thus, a well is formed in which the different chambers of the systems are arranged. The walls of the well are conceived as being made of a reinforced glass fiber material and the bottom may also be designed of the same material, and securely adhered to the wall. The top of the well is provided with a cover 4.

As is best seen from FIGURE 1, a tubular body 5 is arranged in the well space, concentric with the center axis of the well and which forms the regenerating chamber 5' of the system. The walls of the regenerating chamber may also be made of reinforced glass fiber material.

The annular room about the regenerating chamber is divided into two portions by vane-shaped walls 6 and 7, extending diametrically from said walls out towards the walls of the well. The walls 6 and 7 are secured to the outer side of the regenerating chamber and to the inside of the well wall, whereby one portion of the wall forms the sedimentation chamber 8. The portion of the well space on the opposite side of walls 6 and 7 from chamber 8 is divided by another vane-shaped wall 9. This wall extending radially outwards from the cylindrical wall of the regenerating chamber forms the mixing and buffer chamber 10 of the system, and a somewhat smaller room which forms the flocculating chamber 11 of the system. Arranged at the bottom of the mixing chamber at its left hand side is an agitating cushion 12 made of foam plastic, and an air lift pump 13, 13' on the right hand side thereof. The agitator cushion and the air lift pump are both supplied with compressed air from a distributing line 14, supplied from a supply line 15, which in turn is connected to an aerating unit 16, (FIG. 2). The air lift pump 13, 13' is provided at its bottom with a conical plate 17 to ensure that the most advantageous flow conditions are obtained.

A foam plastic agitating cushion 18 is also arranged on the right hand side of the bottom of the flocculating chamber 11, and is supplied with air through the line 19. This arrangement is intended to provide for a slight agitation in the flocculating chamber. The sewage water is intended to be transferred together with the formed floc from the flocculating chamber to the sedimentation chamber 8, through an opening 20 in the wall 7. The floc is intended to be settled in the chamber 8.

To prevent a direct flow to the spillway 32 of the sedimentation chamber 8 the opening 20 is shielded by means of a plate 21, which is disposed in the center of the opening 20 within the sedimentation chamber, some distance from the wall 7.

The bottom of the regenerating chamber with the exception of "tooth-gap" portions 22, which are turned to face the sedimentation chamber, is completely covered by a foam plastic aerating cushion 23, to which compressed air is supplied through the pipe 24. The cylindrical wall of the regenerating chamber is provided opposite the the tooth-gap portions 22 with corresponding recesses, which means that the sludge settled on the bottom of the sedimentation chamber 8 can run into the regenerating chamber 5'. Since a uniform and even flow of air upwards in the regenerating chamber is obtained by the aerating cushion 23, an intensive aeration of the sludge introduced therein is obtained, and the regenerating chamber 8 simultaneously acts as one large air lift pump. The introduced regenerating sludge is thus lifted in the regenerating chamber until it passes over the edge of a spillway tube 25, by which the sludge is intended to be returned into the sedimentation chamber 8.

According to the invention regenerated sludge is intended to be transferred from the regenerating chamber to the mixing chamber in quantities which are in proportion to the quantity of sewage water introduced into the mixing chamber through the conduit 26. For this purpose a metering arrangement is arranged between the regenerating chamber and the mixing chamber. The metering arrangement in the shown system is in the form of a tiltable scoop 27 presenting two halves. One large "half" 28 is intended to take up inflowing sewage water, and a smaller "half" 29 is intended to take up given quantities of regenerated sludge. The scooper 27 is mounted on bearings 30 on the wall of the regenerating chamber. Arranged below the half 28 in the mixing chamber is a coarse screen in the form of a basket 31, for separating coarse impurities and coarse fibrous material. A tube 32 is arranged for aerating the purification system. The system functions in the following manner:

The sewage water enters the system in bursts through the inlet 26, and runs down into the scoop half 28. As is shown in FIGURE 2, the regenerating chamber 5' is assumed to be full with regenerated sludge and the scoop half 29 is thus immersed in said sludge. As soon as the scoop half 28 is full of sewage water, the double sided scoop tilts and the sludge water and regenerated sludge are emptied into the mixing chamber 10 through the screen 31. The scoop is so designed that the volume of regenerated sludge transferred to the mixing chamber constitutes not more than 10–20 percent by volume of the quantity of sewage water introduced each time by the scoop half 28. Agitation is caused in the mixing and buffer chamber 10 by means of the aerating cushion 12, which ensures that the largest possible surface of the particles of the regenerated sludge is exposed to the sludge in the sewage water. Consequently, the largest possible surface of the sludge is also accessable for adsorption of the dissolved organic impurities in the sewage water. This sequence constitutes the first stage in the activated sludge process according to the invention.

The mixture of sewage water and regenerated activated sludge is pumped by means of an air lift pump 13, 13' from the mixing or equalizing chamber, which is dimensioned so that the same has extra space for accumulating suddenly overflowing sewage water, to the flocculating chamber 11, where the floc is reformed during slight stirring. In this instance the stirring shall only be sufficient to avoid sedimentation.

The mixture passes from the flocculating chamber through the opening 20 in the wall 7 to the sedimentation chamber. The flow of liquid is directed downwards by the plate 21, so as not to disturb the sedimentation.

Subsequent to the sedimentation process the clarified water passes over a spillway 32 and through an outlet conduit 33 to the recipient. The spillway determines the liquid level in both the sedimentation and flocculation chambers.

The settled sludge on the bottom of the sedimentation chamber, due to the air lift action in the regenerating chamber 5', is sucked through the openings 22 to said chamber. Incoming sludge is drawn upwards from the tooth-gaps, while being aerated constantly. No agitation takes place, since the air cushion 33 is distributed over practically the whole of the bottom of the regenerating chamber. The whole mass of sludge thus moves upwards in the chamber, practically like a piston. The sludge level in the regenerating chamber is kept constant by means of a spillway tube 25, so that the metering scoop 29 is always immersed into the sludge to an equal level and a sufficient extent.

The sludge from the spillway 25 returns to the sedimentation chamber.

Mineralization of the organic constituents is effected in the following manner: The dissolved organic constituents are adsorbed in the mixing chamber on the surface of the active bacteria supplied with the regenerated sludge. After sedimentation and suction of the sediment into the sludge regenerating chamber the organic substances are absorbed by the "bodies" of the bacteria. Subsequent to strong aeration in the sludge regenerating chamber the bacteria are supplied with oxygen through the air bubbles, which also absorb the carbon dioxide $CO_2$, appearing during the process of combustion in the bacteria.

The mineralized organic impurities increase the amount of sludge, which means that surplus sludge, to an amount of approximately ⅓ of the volume of the incoming sewage water, must either be removed continuously or intermittently. This can easily be effected by means of an extra scoop arrangement on the metering scoop.

What we claim is:

1. A water purifying system of the type using flocculation and aeration means, said system comprising: a substantially-closed tank, partition means within said tank for separately defining within said tank, first, second and third generally closed chambers, fluid inlet means for delivering water to be purified to said first chamber, means for causing flocculation of said fluid carried by said first chamber and causing said flocculated fluid to enter said second chamber for sedimentation, means between said second and third chambers for causing portions of the sludge from the bottom of said sedimentation chamber to enter said third chamber, means for activating sludge received from said sedimentation chamber within said third chamber, and means for feeding reactivated sludge from said third regenerating chamber to one of said other chambers in proportion to flow from said inlet means to equalize the amount of sludge present in said other chamber.

2. The water purifying system, as claimed in claim 1, further comprising: clarified water outlet means carried by said unit and in communication with said sedimentation chamber for controlling the level of contents in both said sedimentation and flocculating chambers.

3. The water purifying system, as claimed in claim 1, wherein said partition means divides the first chamber in two, to define a fourth substantially closed buffer chamber positioned in the flow path so as to be intermediate the fluid inlet means delivering the water to be purified and said first chamber, said fourth chamber including a buffer screen for separating coarse impurities from the water to be purified and further including aerating means in the form of air cushions whereby air issuing from said aerating cushions serves to agitate the contents of said buffer chamber.

4. The water purifying system as claimed in claim 3 further comprising air pumps for circulating fluid from at least one of said chambers to at least one of said other chambers.

5. The water purifying system as claimed in claim 1 wherein said means for directing flocculating fluid from said flocculation chamber to said sedimentation chamber comprises a baffled opening carried by common partition means separating said chambers and located in the vicinity of the upper end thereof.

6. The water purifying system as claimed in claim 1 wherein said means for proportionally feeding reactivated sludge from said regenerating chamber to said equalizing chamber comprises a tiltable scoop mounted in cooperating relation to said fluid inlet and the interior of said regenerating chamber whereby a quantity of regenerated sludge is automatically supplied from said third chamber to said first chamber for each relatively fixed quantity of unpurified water discharged through said inlet means.

7. The water purifying system as claimed in claim 6 wherein said partition means comprises an integral unit consisting of a vertically oriented cylinder located centrally of said tank and defining said third chamber, and said partition means further comprises a series of radially directed fins from the outer periphery of said central cylinder to define said first, second and said fourth chambers, all peripherally disposed about said central third chamber.

8. The water purifying system as claimed in claim 7 wherein said buffer and flocculating chamber occupy approximately one-half of the volume of the tank surrounding said central regenerating chamber and said sedimentation chamber comprises the remainder of the volume surrounding said regenerating chamber.

References Cited

UNITED STATES PATENTS

| | | | |
|---|---|---|---|
| 1,790,975 | 2/1931 | Dallas et al. | 210—220 X |
| 1,893,623 | 1/1933 | Imhoff | 210—197 X |
| 2,027,370 | 1/1936 | Currie | 210—220 X |
| 2,430,519 | 11/1947 | Mallory | 210—195 X |
| 2,901,114 | 8/1959 | Smith et al. | 210—256 X |

FOREIGN PATENTS 934,146    8/1963    Great Britain.

JAMES L. DECESARE, Primary Examiner

U.S. Cl. X.R.

210—220, 256